United States Patent
Bruck et al.

(10) Patent No.: US 8,712,585 B2
(45) Date of Patent: Apr. 29, 2014

(54) BULK VENDING APPARATUS, SYSTEM AND METHOD

(75) Inventors: Robert Bruck, Roslyn, NY (US); Christopher Gerding, Wadsworth, OH (US)

(73) Assignee: Lama Group, LLC, New York, NY (US)

( * ) Notice: Subject to any disclaimer, the term of this patent is extended or adjusted under 35 U.S.C. 154(b) by 677 days.

(21) Appl. No.: 12/927,524

(22) Filed: Nov. 16, 2010

(65) Prior Publication Data
US 2012/0029690 A1    Feb. 2, 2012

Related U.S. Application Data

(60) Provisional application No. 61/400,514, filed on Jul. 28, 2010.

(51) Int. Cl.
*G06F 17/00* (2006.01)

(52) U.S. Cl.
USPC .......................... 700/242; 700/236; 221/124

(58) Field of Classification Search
USPC ............ 700/236, 244, 242, 231, 232; 221/24, 221/92, 123, 124, 133
See application file for complete search history.

(56) References Cited

U.S. PATENT DOCUMENTS

| | | | |
|---|---|---|---|
| D83,353 S | | 2/1931 | Sand, Jr. |
| D89,112 S | | 1/1933 | Katz |
| D175,225 S | | 7/1955 | Lane |
| D294,204 S | | 2/1988 | Tombs et al. |
| D313,822 S | | 1/1991 | Brown et al. |
| 5,097,982 A | * | 3/1992 | Kedem et al. ...................... 221/3 |
| D339,163 S | | 9/1993 | Moore |
| 5,533,645 A | * | 7/1996 | Wittern et al. ................... 221/76 |
| D384,700 S | | 10/1997 | Schwarzli |
| 5,685,435 A | | 11/1997 | Picioccio et al. |
| 5,997,236 A | * | 12/1999 | Picioccio et al. ............. 221/197 |
| 6,182,861 B1 | | 2/2001 | Kovens et al. |
| D465,810 S | * | 11/2002 | Bartholomew et al. .......... D20/1 |
| D466,941 S | | 12/2002 | Shubert et al. |
| 6,505,095 B1 | * | 1/2003 | Kolls ............................. 700/244 |
| 6,925,871 B2 | * | 8/2005 | Frank ............................... 73/293 |
| 7,113,125 B2 | * | 9/2006 | Le Sesne ....................... 342/124 |
| D530,377 S | | 10/2006 | Hart et al. |
| 7,172,094 B2 | * | 2/2007 | Atsuta ........................... 221/130 |
| 7,213,723 B2 | | 5/2007 | Schwarzli |
| D674,841 S | | 1/2013 | Bruck et al. |
| 8,401,697 B2 | * | 3/2013 | Templer et al. ............... 700/236 |
| 2008/0290107 A1 | | 11/2008 | Lock et al. |
| 2012/0029690 A1 | | 2/2012 | Bruck et al. |

FOREIGN PATENT DOCUMENTS

| | | |
|---|---|---|
| JP | 2003-109086 | 4/2003 |
| JP | 2005-242462 | 9/2005 |

OTHER PUBLICATIONS

International Search Report and Written Opinion of the International Searching Authority of PCT/US2011/001335.

* cited by examiner

*Primary Examiner* — Timothy Waggoner

(57) ABSTRACT

A vending machine is provided that includes optional modules. A first module includes a plurality of bins, each sized to contain a consumable product, each bin including a pivotable product container. An optional capsule dispensing apparatus is sized to fit on a side of the first module, the optional capsule dispensing apparatus including a plurality of capsules, each containing either a consumable product or a non-consumable product. An optional second module includes a second plurality of bins, each also sized to contain a consumable product, each bin also having a pivotable product container, the optional second module sized to be removeably attachable to the first module.

20 Claims, 10 Drawing Sheets

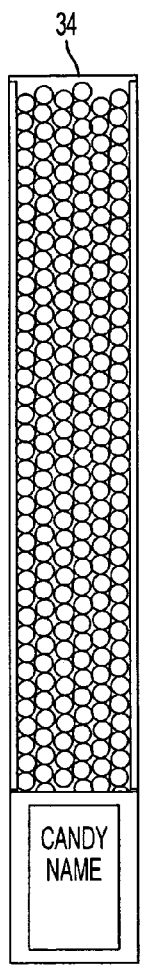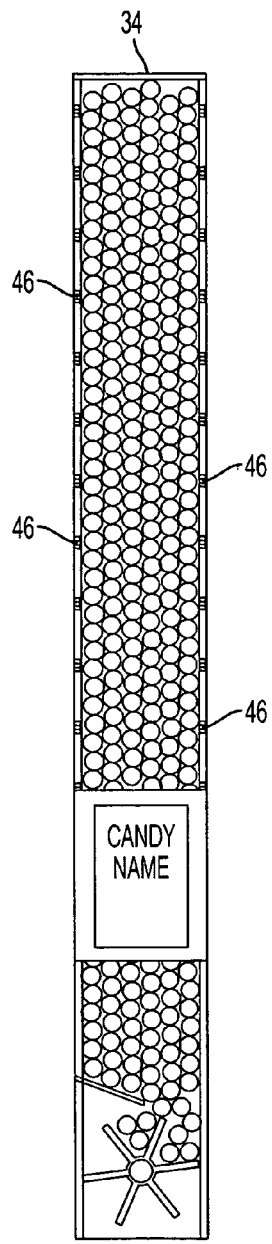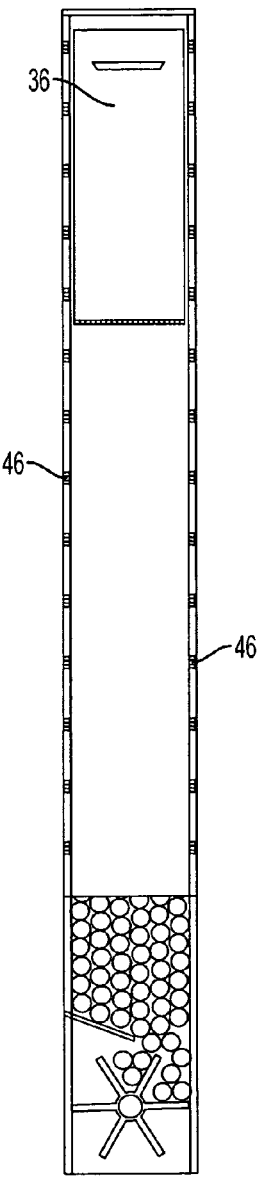
FIG. 6A
FIG. 6B
FIG. 6C

BULK VENDING APPARATUS, SYSTEM AND METHOD

Priority is claimed to provisional application Ser. No. 61/400,514, filed Jul. 28, 2010, entitled Bulk Vending Apparatus, System and Method, which is referred to and incorporated herein in its entirety by this reference.

FIELD OF THE INVENTION

The present invention generally relates to vending machines. More particularly, the invention concerns a system, method and apparatus to vend bulk items and other consumer goods.

BRIEF DESCRIPTION OF THE DRAWINGS

FIG. 6a-c are front elevation views of a dispensing bin;

It will be recognized that some or all of the Figures are schematic representations for purposes of illustration and do not necessarily depict the actual relative sizes or locations of the elements shown. The Figures are provided for the purpose of illustrating one or more embodiments of the invention.

DETAILED DESCRIPTION OF THE PREFERRED EMBODIMENTS

In the following description, for the purposes of explanation, numerous specific details are set forth in order to provide a thorough understanding of the vending machine (hereinafter "VM"). It will be apparent, however, to one skilled in the art that the VM may be practiced without some of these specific details. Throughout this description, the embodiments and examples shown should be considered as exemplars, rather than as limitations on the VM. That is, the following description provides examples, and the accompanying drawings show various examples for the purposes of illustration. However, these examples should not be construed in a limiting sense as they are merely intended to provide examples of the VM rather than to provide an exhaustive list of all possible implementations of the VM.

Specific embodiments of the invention will now be further described by the following, non-limiting examples which will serve to illustrate various features. The examples are intended merely to facilitate an understanding of ways in which the invention may be practiced and to further enable those of skill in the art to practice the invention. Accordingly, the examples should not be construed as limiting the scope of the invention.

Referring to FIGS. 1-9, one embodiment of the vending machine ("VM") 10 comprises an apparatus and system that dispenses bulk items such as candy, coffee, confection, nuts, and other food items. The VM 10 employs a combination of touch screen, pushbuttons, a payment system, and mechanical and motorized devices to deliver consumable goods to a buyer. Non-food items such as screws and bolts may also be possible to dispense, and are considered within the scope of the invention. The VM 10 dispenses bulk items stored in bins, the contents of which are mechanically transferred into a disposable container, such as a bag, cup or bowl. The VM 10 also allows the customer to purchase or win capsules which may contain food goods or other items that are not easily dispensed through the bulk bin method. The capsules may include items such as, but not limited to, food, clothing, toys, tickets, and personal electronics. Capsules may also be dispensed as a prize through a skill or luck based redemption game installed on the VM 10. Thus the VM 10 comprises both a method to dispense bulk items and capsules in a single device.

Figure 1:
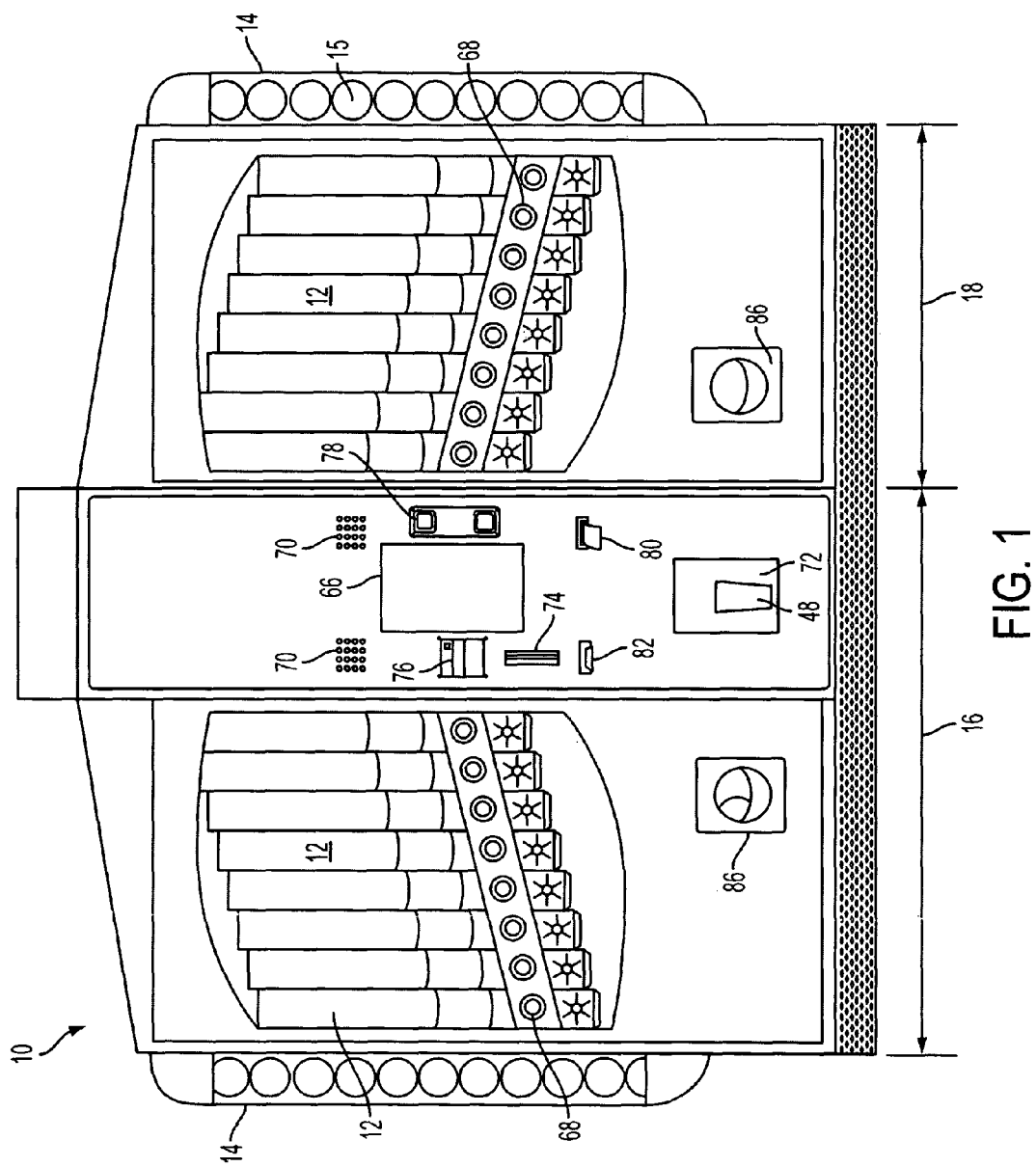
FIG. 1 is a front elevation view of one embodiment of the vending machine comprising the present invention.
Figure 2A:
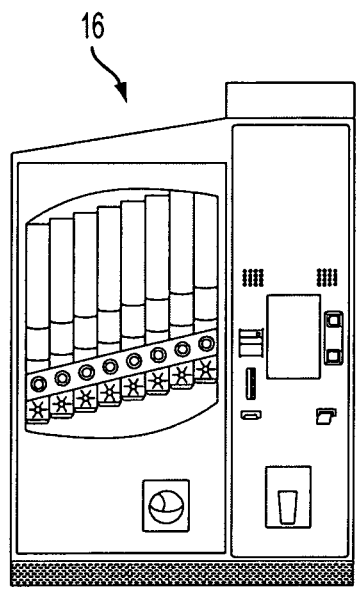
FIG. 2a-e is front elevation views of different embodiments of the vending machine.
Figure 2B:
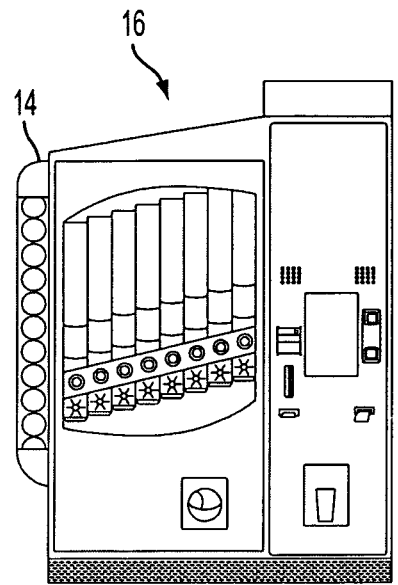
Figure 2C:
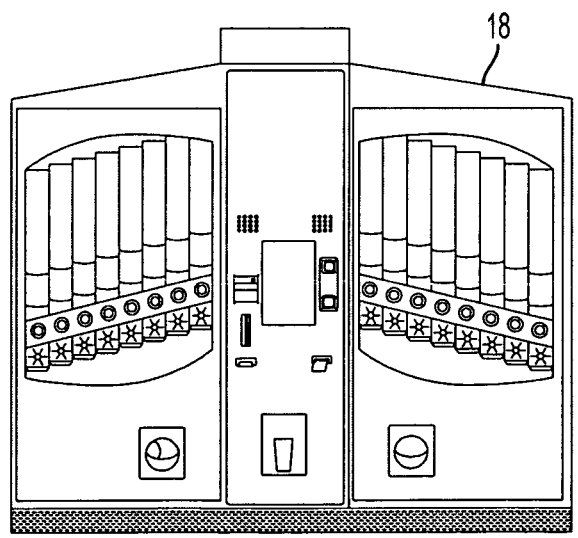
Figure 2D:
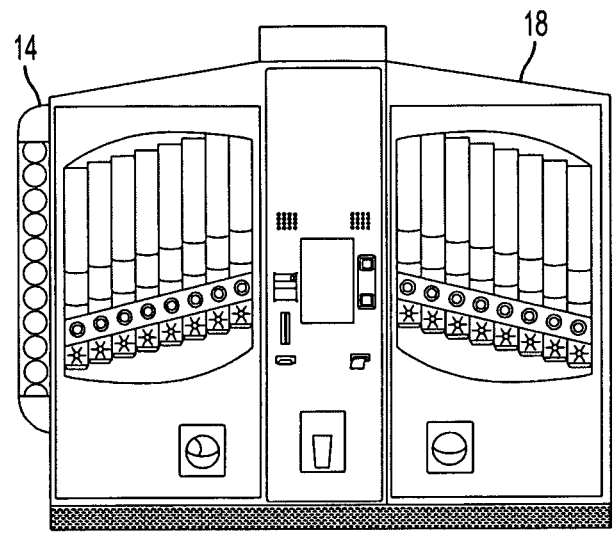
Figure 2E:
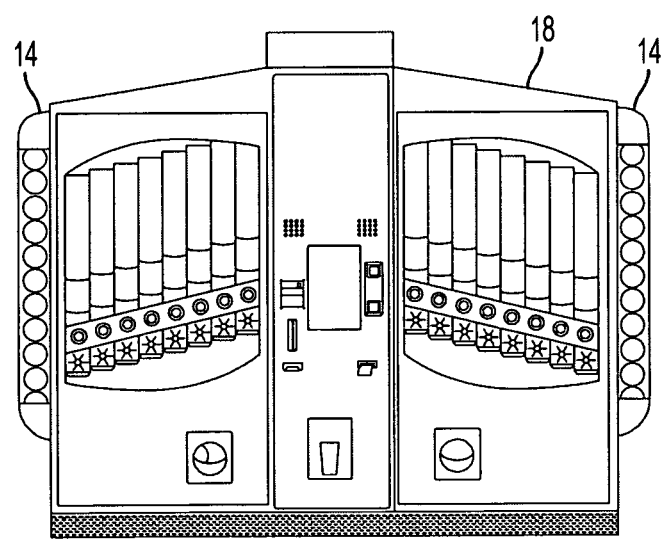

Referring now to FIGS. 1-2, several embodiments of the VM 10 are illustrated. One feature of the VM 10 is a modular design that enables flexibility to suit various locations and applications. This is achieved by providing an expandable and modular design that allows the number of bulk dispensing bins 12, as well as capsule dispensers 14 to vary. The embodiment shown in FIG. 1 comprises a first module 16, and a second module 18. As shown in FIG. 2a, one embodiment of the VM 10 comprises only a first module 16 that includes eight dispensing bins 12 in an enclosed unit. The eight dispending bins 12 can be expanded to 16 dispensing bins 12 by adding a second module 18, as shown in FIGS. 1 and 2c-e. The second module 18 has an additional eight dispensing bins 12. The second module 18 is removeably attached to the first module 16 by fasteners and electrical connectors. The number of dispensing bins 12 described is an example only, as fewer or more dispensing bins 12 are considered in the scope of the VM 10.

Figure 3:
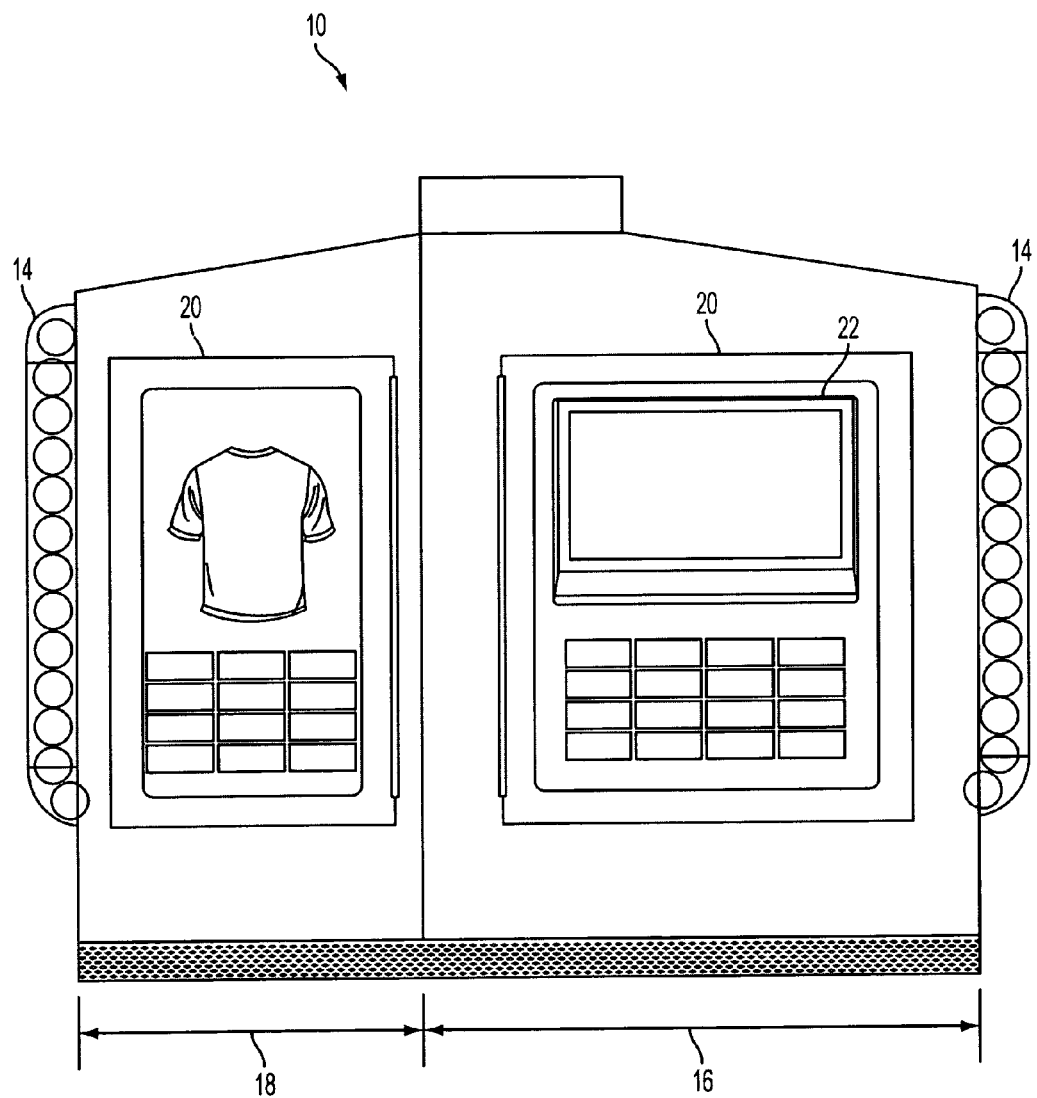
FIG. 3 is a rear elevation view of the embodiment illustrated in FIG. 1.

Another embodiment of the VM 10 is illustrated in FIG. 3, which is designed to be placed in the middle of a room or hallway, where the back of the VM 10 is visible and accessible to the customer. As shown in the FIG. 3, the back of the VM 10 includes two display cases 20 that can display a variety of goods such as clothing, food, toys and electronic items, as well as a monitor 22 that may run advertisements and video files loaded into the onboard computer (discussed below).

Figure 4:
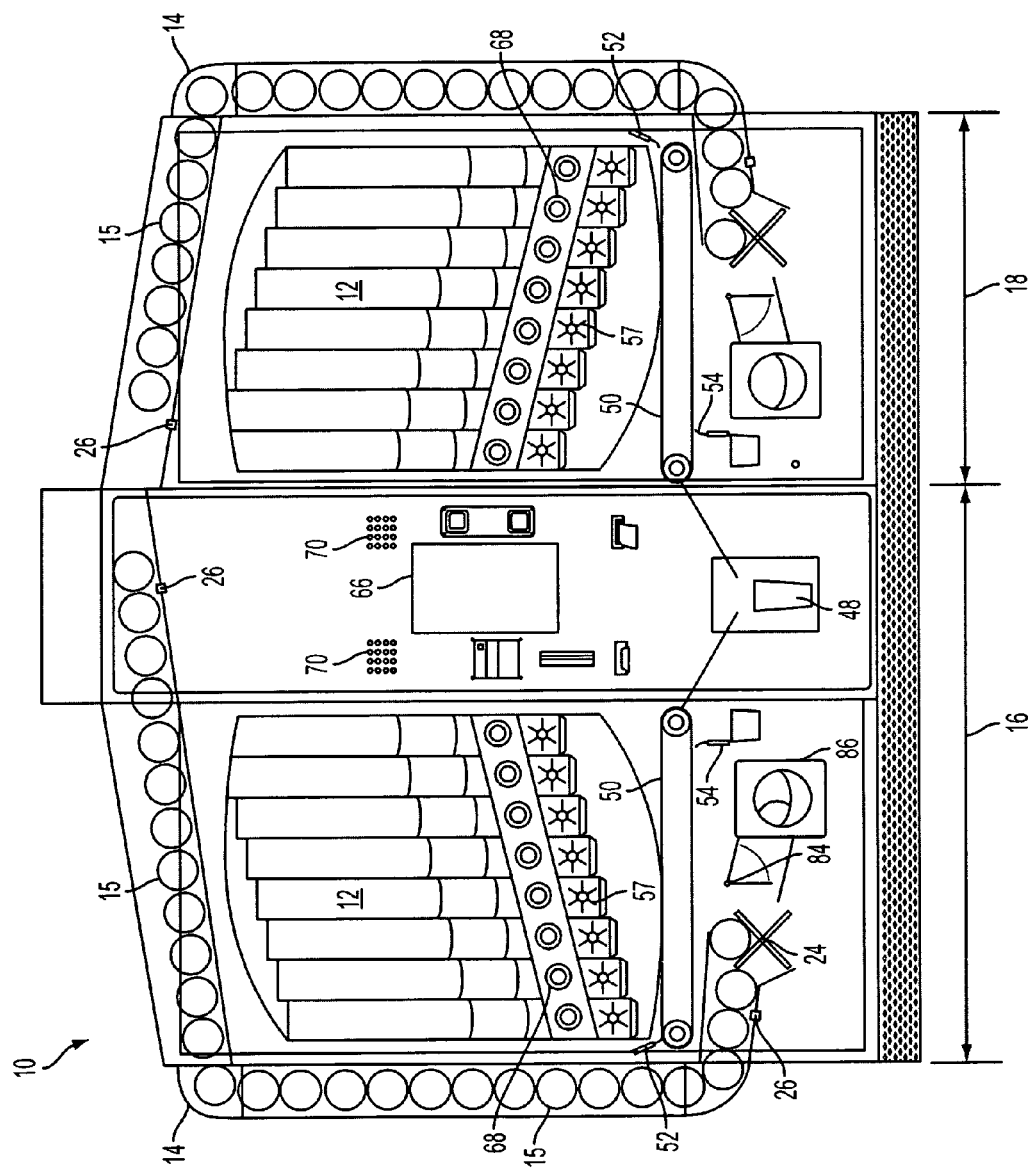
FIG. 4 is a front elevation view of the embodiment illustrated in FIG. 1, showing internal details of a capsule dispensing system.
Figure 5A:
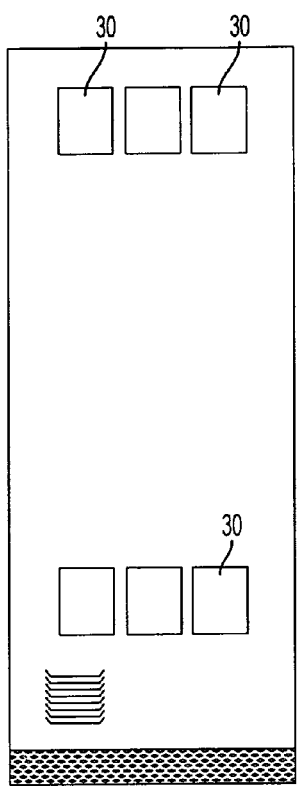
FIG. 5a-c is a view of different embodiments of the top of the vending machine.
Figure 5B:
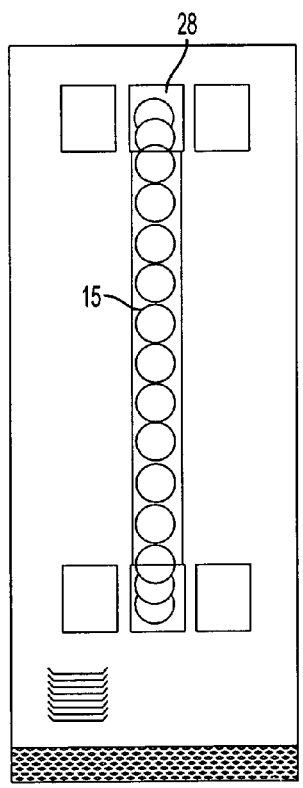
Figure 5C:
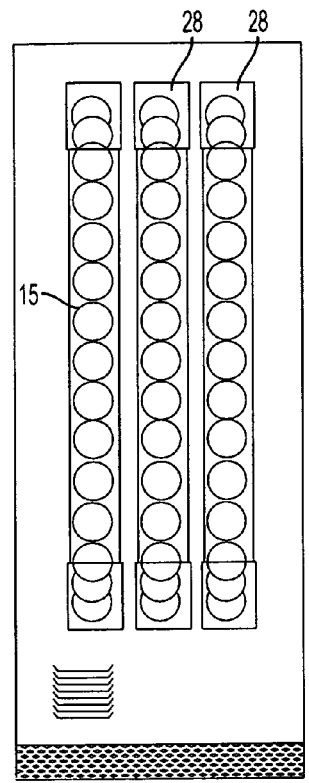

As shown in FIG. 4 and in FIGS. 1-3, the VM 10 can also include a capsule dispenser 14. The capsule dispenser 14 comprises a mechanism that includes a tube, or tubes that attach to the side of the VM 10. The capsule dispensing mechanism enhances the product to vend alternate items that cannot be dispensed through the bin method such as, but not limited to, food, clothing, toys, tickets, and personal electronics. As shown in FIG. 4, motor rotated dispense mechanism 24, such as a fan, turns to allow a single capsule 15 to progress along a tube past a one-way door 84 where it can be received by the customer at capsule outlet 86. The capsule 15 may be an openable sphere, or it may be tubular, or any other desired shape. The capsule dispensing motor (not shown) is activated to coincide with a purchase, or a prize rewarded through the VM 10 software. An optical or switch detect system 26 (shown in FIG. 4) at both the top and bottom of the capsule dispensing channel 28, shown in FIG. 5b-c, verifies the number of capsules in the VM 10, and confirms a successful capsule vend. FIG. 5a-c shows the top of the VM 10. FIG. 5b shows one capsule channel 28, FIG. 5c shows three capsule channels 28, and FIG. 5a shows blanking plates 30, which can be removed to install the capsule channels 28.

The software managing the VM 10 is programmable by the owner for the number of bins 12 and number of capsule dispensers 14 attached to the VM 10, with multiple configurations being available. The number of capsules in the VM 10 and their contents, the transactions, and reported vend failures are recorded and communicated remotely through the TCP/IP or cellular network described below, further improving the serviceability of the VM 10.

The VM 10 combines several unique features that will make it successful in the market and novel in its execution. One feature comprises bulk storage bins 12 contained in the VM 10. Each bin 12 has an electronic weight scale and light sensitive bin level detection system. This enables the VM 10 to determine the amount of remaining bin contents and communicate via a communication link, such as the Internet or a cellular network using an onboard computer (not shown) that communicates with an offsite server to inform the operator of the VM 10 status, such as vend failure and bin 12 levels (i.e., the amount of bulk goods remaining in each bin). The VM 10 also verifies that bulk items are being dispensed properly and detects if any errors occur during the vend process. In addition, the VM 10 can use a weight and level indication in each bin 12 to calculate volume and density of the contents of each bin 12. This information may be used to determine and graphically display how a single vend, or stepped rotation of a motorized fan dispenser, will impact the fill level of the receiving vessel (i.e. cup) before the vend occurs. The customer can see on the liquid crystal display (LCD) how much of the cup remains to be filled, and can choose the same or alternate bulk items available to continue to fill the vessel to the top if desired. Since the volume of each dispense for a particular item is determined, the VM 10 can prevent the vessel from overfilling before dispensing.

Figure 7:
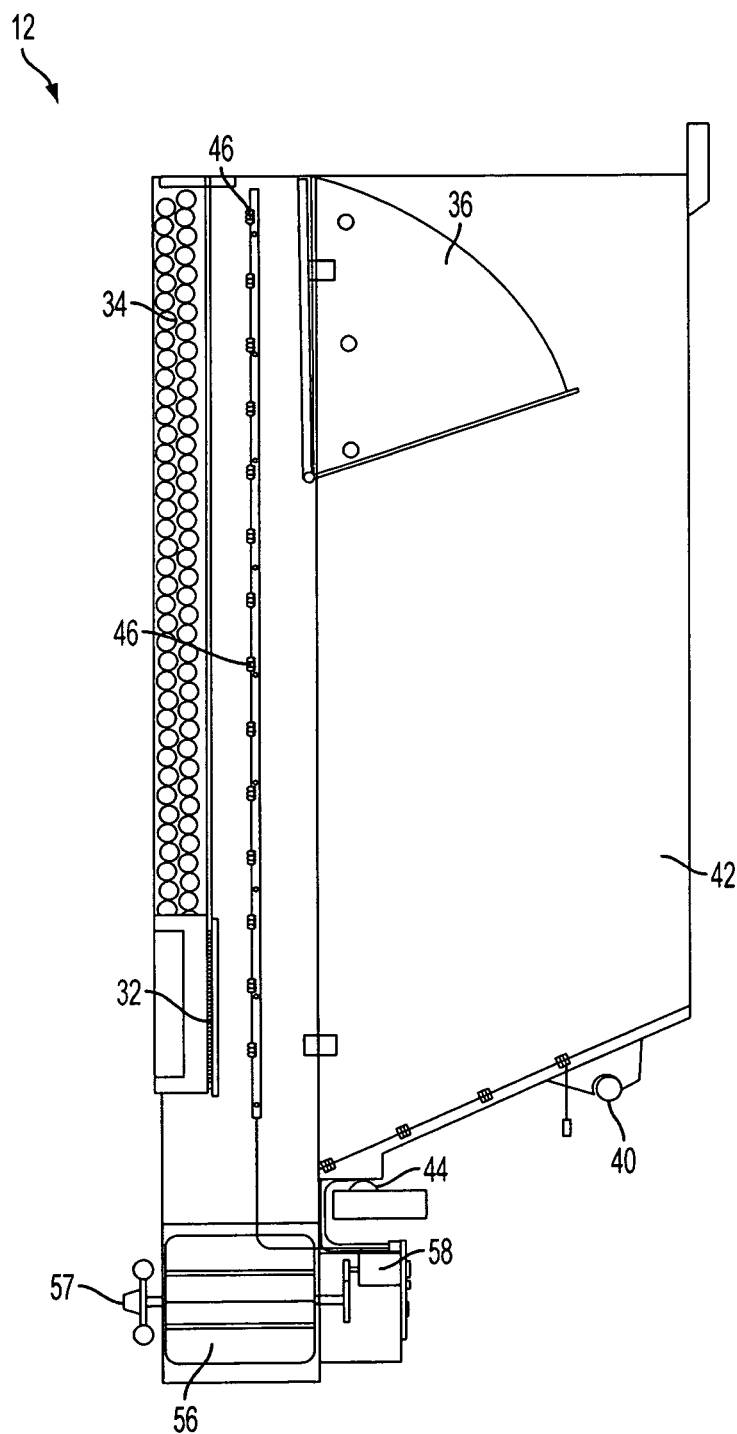
FIG. 7 is a side elevation view of a dispensing bin contained in the embodiment of the vending machine illustrated in FIG. 1.

As shown in FIG. 7 the disclosed bin 12 is also unique in that various LED lights 32 embedded in the bin 12 illuminate based on customer selection. The customer sees the front of the bin 12 light up, confirming the selection of a particular bulk item, which enhances the buying experience and increases customer interest.

Figure 8:
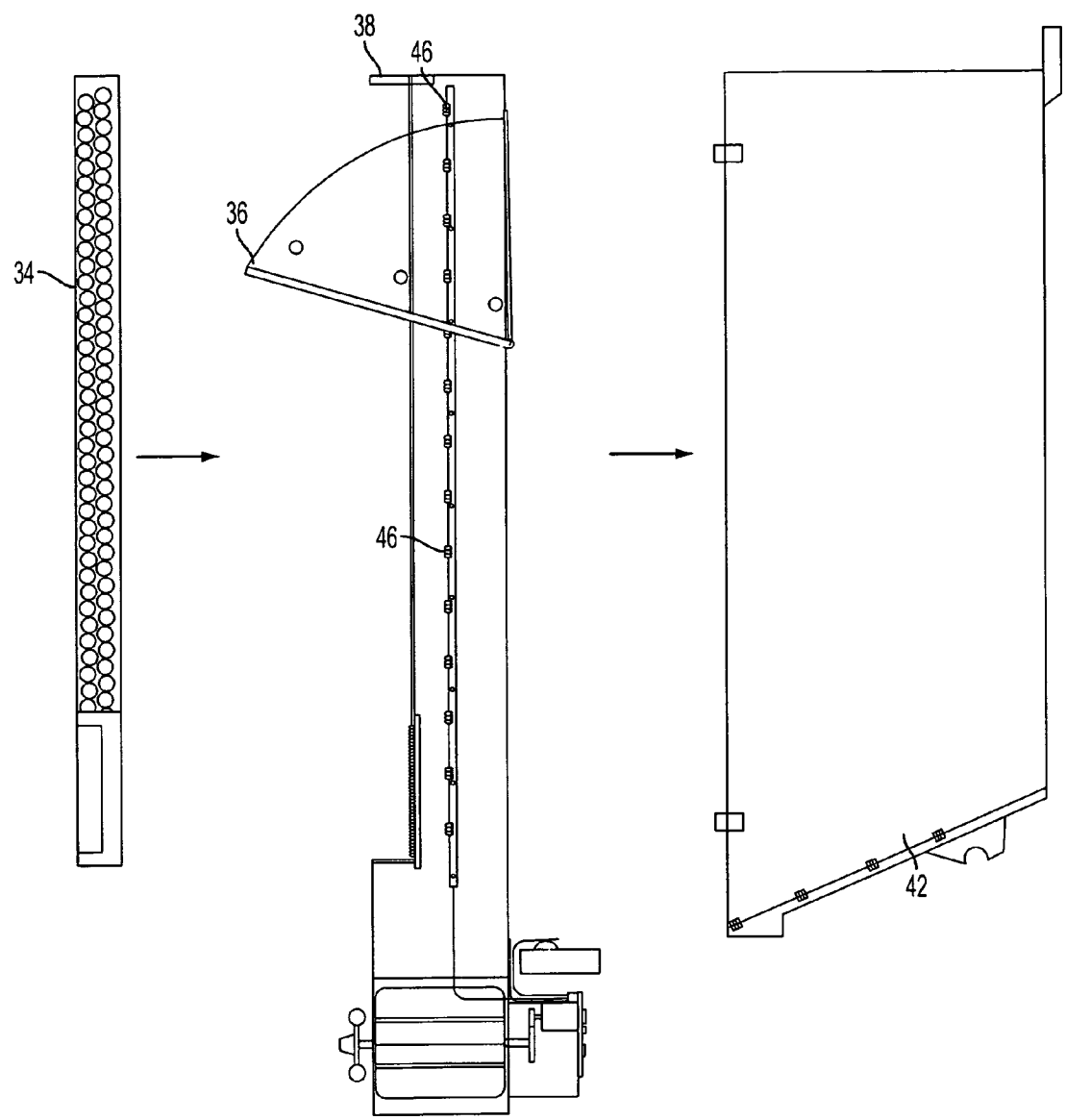
FIG. 8 is an exploded view of the dispensing bin illustrated in FIG. 7.

Referring now to FIGS. 6-8, the disclosed bin 12 is also unique in that it can be filled from the front of the bin. Traditional bins require filling from the top of the bin, which can be inconvenient in an automated bulk vend system. As shown in FIGS. 6-8, the bin 12 has a clear plastic false front 34 that is filled with the bulk item type. The false front 34 makes it appear that the bin 12 is full to the top, regardless of the actual bin 12 level. The owner removes the false front 34 and gains access to a door 36 that tips out at an angle ideal for filling. In one embodiment, a bin switch 38 sends a signal to the VM 10 that the bin 12 is in a fill phase, and communicates the weight to the operator audibly and visually through the speakers and LCD. An alternative embodiment does not require that the door 36 is covered by the false front 34.

As shown in FIGS. 7-8, unique to the bin 12 and VM 10, is the method in which the weight of the bin 12 and goods are determined. The bin 12 sits on a pivot point 40 towards the back of the goods cabinet 42. A FSR (force sensing resistor) or load sensor 44 is located below a projection on the bin 12 and the projection rests upon the load sensor 44. The FSR or load sensor 44 communicates the sensed weight to a processor mounted to the bin 12, or located elsewhere in the VM 10. As the goods or consumable product are dispensed, the weight of the bin 12 will decrease, confirming a successful bin and tracking the amount a single vend will dispense. The FSR or load sensor 44 will also communicate to the operator when the weight has reached a level that is the maximum fill level of the bin 12, which is further confirmed by the light emitters and detectors installed to the bin 12 (discussed next), and also visibly shown on the LCD screen.

Again referring to FIGS. 7-8, bin level is determined by a series of light emitters and light detectors 46 running down the side of the bin 12. A light emitter is on one side of the bin 12, and a light detector is on the other side, with the sides of the bin 12 being transparent. As the bin level falls, light detectors further down the bin will be activated, thereby notifying the VM 10 of the current bin level. This method enables the VM 10 to know the bin level because the bin level is not visible from the outside of the cabinet, as it is covered by the false front 34. Another embodiment of the VM 10 may use solar cells as the method of light detection. As the level of the bin drops, more surface area of the solar cell will be exposed to light, thereby increasing the voltage generated by the solar cells. This level detection method results in an analog slope, greatly improving the resolution of level detection over traditional light sensors that are stepped in a digital method (i.e., on and off). This application of solar cells to detect level is unique to this embodiment of the VM 10, however alternative level detection applications may also be employed.

Referring now to FIG. 4, unique to the VM 10 is the method of bulk item transfer from the bin 12 to a vessel 48. Prior related inventions use gravity alone to transfer the dispensed goods to the vessel, such as an angled chute through which the goods travel after falling from the bin. Such a method has disadvantages, such as a particularly sticky candy may get stuck in the chute or leave residue on the chute floor over time. The VM 10 resolves this issue via a self-cleaning conveyor belt system. Goods, such as candy or other times in the bins 12 fall onto a conveyor belt 50, which then moves the product to the vessel 480. The belt 50 has a scraper 52 and brush 54, which act to clean any residue and ensure that vended product ends up in the vessel 48. Alternative methods of cleaning are considered, such as the blowing of high pressure air over the belt 50 to clean the debris. Also, one scraper 52 may be sufficient, and the brush 54 located on the underside of the conveyor belt 50 may be eliminated, or vice-versa.

Figure 9:
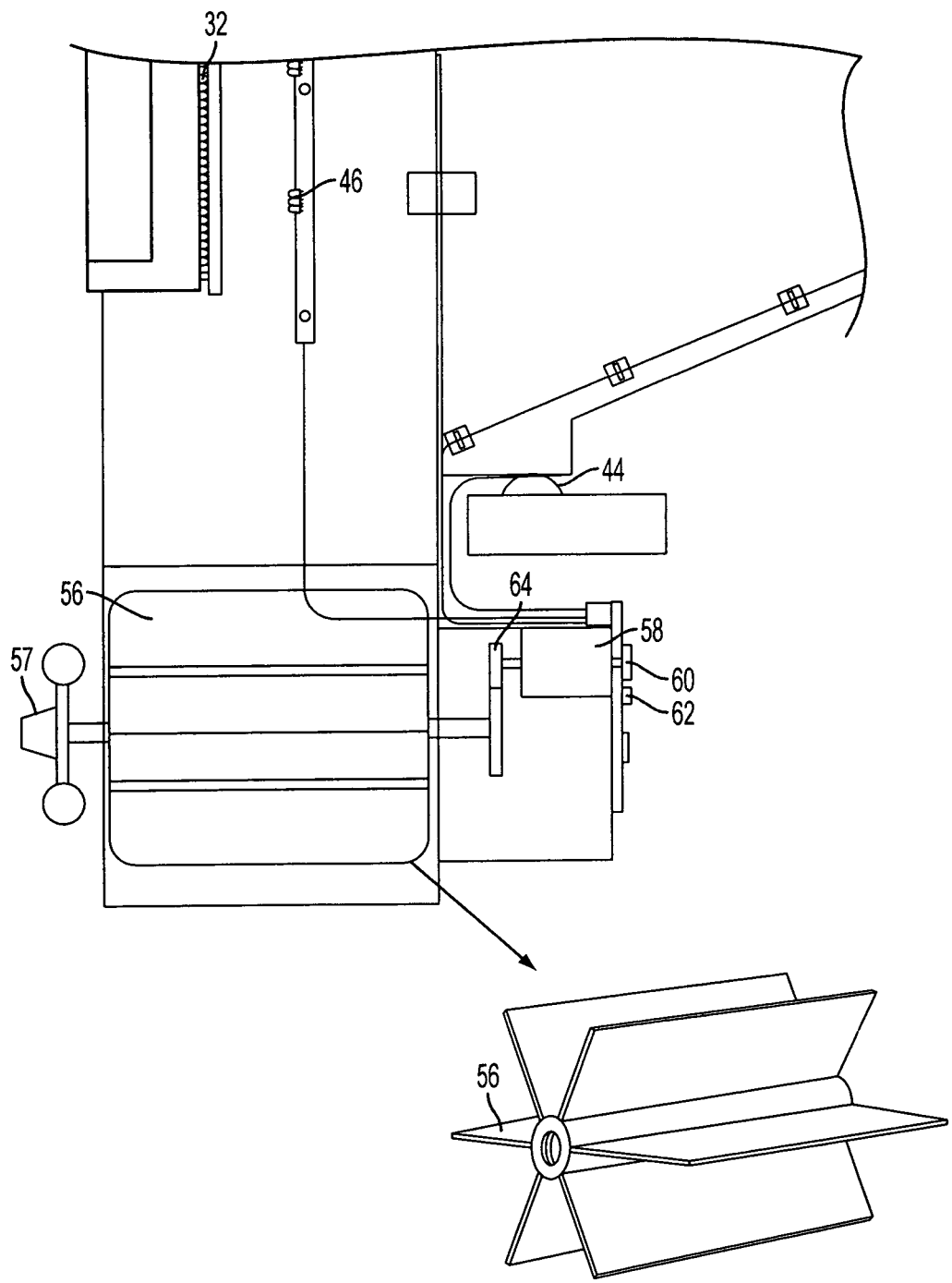
FIG. 9 is a side elevation view of portion of the dispensing bin illustrated in FIG. 7.

The disclosed bin 12 is also unique in the method employed to dispense bulk goods. As shown in FIGS. 7 and 9, the bin 12 uses a rubberized, or other flexible material fan 56 that turns on a shaft substantially perpendicular to the storage section of the bin 12. A decorative handle 57 Bulk items sitting above the fan 56 fall into a lower section of the fan by gravity. Rotation of the fan 56 drops the goods to a receiving area. The VM 10 is the first of its kind to motorize the fan 56 to automate the process. The motorized method employed in the VM 10 is also unique. A motor 58 communicates with a processor located in the VM 10 (not shown). As shown in FIG. 9, the motor 58 includes an installed device that enables the VM 10 to detect the number of revolutions. Some methods considered to achieve the rotational count include a micro-switch, optical sensor, a hall sensor or other device that detects the rotations based on the polarity changes of a magnet 60 attached to the shaft of the motor 58. The addition of a micro-switch after the gears 64 in combination with a hall sensor 62 on the motor 58 also allows the VM 10 to detect if there is a defect in the gears 64, as rotation from motor 58 can be compared to rotation of the geared shaft. Tracking the rotations of the motor 58 is useful in confirming that a successful vend has occurred, and if not, can inform the VM 10 to correct by alternating the directions of the motor 58 to shake the fan 56, in the case where a jam has occurred, as well as detect if a jam cannot be corrected through the shake method, the motor 58 will shut down to prevent damage to the motor 58 and drive system. In the case where a stripped gear is detected, the VM 10 can shut down the motor 58 until service is rendered.

Another feature of the VM 10 is a motor with an offset weight that when turned causes a vibration to occur, and is attached to the bin 12 behind the fan 56. The vibration motor (not shown) agitates the candy as it falls into the rubber fan 56, thereby causing a more even fill of product in the fan chamber, and also preventing candy from sticking or jamming in the fan chamber. The vibration motor is powered during the vend process, but can also be independently controlled by the VM 10 control system to periodically agitate the candy to prevent the candy from settling and creating a jam in the bin 12. In addition, a secondary vibration motor may also be attached to the underside of the back of the bin 12 as well (not shown). This motor would be powered at intervals throughout the day to keep the candy in the bin chamber from settling, thereby preventing a jam from occurring in a future vend. The vended goods are dispensed into the vessel 48, which is delivered down a chute located in the first module 16, and deposited in the vessel receipt area behind the cup door 72.

The VM 10 includes a general purpose computing device, including a processing unit, a system memory, and a system bus that couples various system components, and sensors located in the VM 10, as well as the system memory to the processing unit. The system bus may be any of several types of bus structures including a memory bus or memory controller, a peripheral bus, and a local bus using any of a variety of bus architectures. The system memory includes read only memory (ROM) and random access memory (RAM). For example, the computer may comprise an embedded data processor connected via an internal bus to a read only memory containing the executable code for causing the microprocessor to perform the functions described herein. The computer may also include a non-volatile memory that may be accessed through a USB interface. The interface can, of course, change dependent on the prevailing interface technology.

The VM 10 computer (not shown) and associated software provides many unique functions. For example, the data the bin 12 generates for goods volume, bin level, and goods weight is useful for the operator of the VM 10. The VM 10 is connected to the Internet through various connection methods known in the art, such as a traditional TCP/IP connection or cellular network. The VM 10 computer communicates with an offsite server to inform the operator of the VM 10 status, such as a vend failure and bin 12 levels. This information is useful to the operator before travelling to the VM 10 for refill, as the amount and type of bulk items or goods required to refill can be determined before the operator travels to service the VM 10.

One feature of the VM 10 software is that it allows the customer to purchase more than one vessel 48 (containing desired goods) in a single monetary transaction. In the case that the customer desires to have two cups or vessels, each with less than a full amount, the software is designed to coordinate the customer request by an intuitive graphical interface displayed on the touch-screen touch-screen monitor 66 shown in FIGS. 1 and 4. A cup management system enables the customer to create, view, and edit independent cups in a single transaction before vending occurs.

Another feature of the VM 10 is the method of customer interaction. In one embodiment, a customer may approach the VM 10, and the VM 10 detects the customer presence by an electrical eye, or other system. Volume and lighting affects will increase when customer presence is detected. Customer presence is also detected if any of the illuminateable pushbuttons 68 (shown in FIGS. 1 and 4) on the machine are pressed, if a bill is inserted, the touch screen is touched, or the VM 10 is tilted. Attract videos displayed on the touch-screen monitor 66 will change to more directly inform the customer on the steps required to properly use the VM 10, including the choice of language. The customer inserts money and any available credits appear on the touch-screen monitor 66. The customer can select candy type by pressing the illuminated pushbuttons 68 on the front of the VM 10. When pressed, a graphical image of the vessel (i.e. a cup) will appear on the touch-screen monitor 66 and the vessel will begin to fill based on the candy types selected and number of presses of a particular candy type. The software encourages the customer to try to fill the cup to the top, which may require more credits. If credits are insufficient, the software asks the customer to insert more funds to reach the required amount, or the customer can deselect an item by pressing the illuminated pushbuttons 68 again. The impact of each button press, whether to add or remove candy is graphically depicted on the touch-screen monitor 66. In addition, when the customer presses a particular pushbutton, the VM 10 audio will make a noise or verbalize the name of the candy through one or more speakers 70. A still image of the candy may be shown briefly on the touch-screen monitor 66, and the corresponding bins will light up and flash in excitement for the purchase. Nutritional information relating to the selected goods may also be displayed. When the customer is satisfied with the selection, and all available credits have been applied, the customer presses a "checkout" button. A vessel is dropped into a receiving area behind an electronically locked door. Bins 12 will vend product onto the conveyor belt 50. If mix was not selected, the candy will vend in the order it was dispensed. Upon dispense completion, the cup door will unlock and allow the customer to take the vessel filled with goods (illustrated in FIGS. 1-2). To enable the purchase of the bulk goods and capsule items, a credit card reader 74, bill acceptor 76, coin acceptor 78, receipt dispenser 80, and gift card dispenser 82 are included, as shown in FIGS. 1 and 2.

Also novel to the VM 10 is the redemption and sale function of the VM 10. One embodiment of the software included in the VM 10 is one or more chance games that occur before, during, or after the bulk purchase. The game is played and if a customer is skilled or lucky, a prize will be awarded. For example, after vending the bulk candy, a game is initiated and the player presses a series of illuminated pushbuttons displayed on the touch-screen monitor 66 in a particular and prompted order, that if successfully followed will vend a T-shirt through the capsule dispenser 14. If the customer fails to win, the customer is asked if they would like to purchase any products contained in the capsules 15. This ancillary sale purchase is prompted through the audio and touch-screen monitor 66 interface, and with the insertion of money and confirmation of product selection, the VM 10 will vend the desired item. A receipt is printed for all transactions, be it by credit card, gift-card, token, or cash. The VM 10 may dispense redemption tickets through a gift card, or ticket dispenser 82, which the customer can redeem for prizes at another location. The VM 10 may also print promotional codes on the receipt which can be redeemed for points towards purchase of items on a company website, or other location. Also, the VM 10 may dispense plastic cards that contain promotional codes for prizes that can be redeemed through a company website, including credit bearing gift cards which can be used on the VM 10 for future purchases.

If the VM 10 embodiment includes the capsule dispenser 14, during the dispense cycle, the customer is asked if they would like a chance to win a prize. If yes is selected, a simple game of chance and skill is initiated on the touch-screen monitor 66. There are several levels of prizes, ranging from gift cards to discounts to free capsules 15. If the customer does not win a capsule or candy, they will be asked if they would like to purchase an item from the available capsules, items which are displayed graphically on the touch-screen monitor 66. The VM 10 prompts the customer to insert the corresponding payment, and the customer confirms the purchase. The chosen capsule 15 is dispensed and a receipt is printed for the customer.

It is also considered that customers may wish to only buy goods in the capsules 15 and not the bulk items, and the software will allow the customer to optionally skip the bulk good purchase cycle and buy a capsule directly. In the case where customers wish to purchase both a capsule and a cup in a single transaction, a shopping cart system is employed to simplify to ordering and delivery process. It is also considered that items can be purchased that will be drop shipped to a customer's residence or place of business. The graphical interface on the touch-screen monitor 66 may include for sale items not available at the VM 10, and the customer can, by using a graphical keyboard on the touch-screen monitor 66, enter shipping contact details for these items. The virtual online shopping cart system that is employed is linked to the company web store, and all outside delivery sales are coordinated through the TCP/IP connection in the VM 10.

Also, in one embodiment, when the VM 10 is idle, meaning there are no customers attempting to purchase goods, the VM 10 alters into an attract mode where various videos are displayed on the touch-screen monitor 66 and audio is output through enclosed speakers 70 to attract customers and to advertise products and services. The video is displayed on the touch-screen monitor 66, as well as the optional monitor 22 placed on the back of the VM 10. The video files loaded onto the memory of the computer can be uploaded into the VM 10 by the operator, or can be downloaded by the computer from the server via the TCP/IP connection or cellular network.

The VM 10 may include a modem or other means for establishing communications over a wide area network, such as the Internet. It will be appreciated that the network connections are exemplary and other means of establishing a communications link between the VM 10 computer and the operator may be used. The owner or operator of the VM 10 may log into a graphical user interface from a remote location that communicates with the VM 10. From the remote location, the operator may review sales information including history by time period; review product quantities in each bin 12; change or download new attract messages that are displayed on the monitor 66; change product pricing; review equipment status such as amount of money in the VM 10; review any error reports; and perform other functions.

In one embodiment, the VM 10 does not require a constant internet connection. In the interest of keeping internet bandwidth and server load at a minimum, the VM 10 may only connect to the server at scheduled intervals. Relevant data such as sales transactions are recorded into a server's database system. The VM 10 also queries the database to search for relevant updates that are applied by the operator or administrator. Changes made by the operator or administrator are downloaded by the VM 10 and installed at a scheduled interval. Alternatively, the VM 10 may connect to the server outside of the regularly scheduled interval is when an important issue arises, such as when an error occurs. In this manner operators can address issues in a timely manner.

As disclosed above, and in the Figures, a vending machine is disclosed. In one embodiment, the vending machine comprises a first module comprising a plurality of bins, each sized to contain a consumable product, each bin comprising a pivotable product container. An optional capsule dispensing apparatus is sized to fit on a side of the first module, the optional capsule dispensing apparatus comprising a plurality of capsules, each containing either a consumable product or a non-consumable product. An optional second module comprising a second plurality of bins, each also sized to contain a consumable product, each bin also comprising a pivotable product container, the optional second module sized to be removeably attachable to the first module.

The vending machine further comprises a bin cover sized to cover a portion of each bin that faces a front of the first module, the bin cover structured to receive the consumable product. Each of the bins includes a bin door sized to receive the consumable product, the bin door located on a surface of the bin that faces a front of the first module. A touch-screen monitor is located on a front of the first module, the monitor capable of displaying a video game. A display case is located on a back portion of the first module. A second monitor is located on a back portion of the vending machine, the monitor adapted to display a video image. Each bin includes a plurality of light emitters and light receivers that provide an indication of a consumable product quantity in each bin. A consumable product conveyor including a circulating belt and a circulating belt cleaning element is also included.

In a second embodiment the vending machine comprises a first module that includes a plurality of bins, each sized to contain a consumable product, each bin comprising a pivotable product container. An interface is structured to receive a user request for one of the consumable products. A controller for dispensing the requested consumable product from the associated bin in an amount corresponding to the user request is included. A second module comprising a second plurality of bins is removeably coupled to the first module, each also sized to contain a consumable product, each bin also comprising a pivotable product container, the optional second module responsive to the interface and the controller so that the consumable products in the second plurality of bins are dispensed in response to the user request.

The second embodiment of the vending machine includes an optional capsule dispensing apparatus sized to fit on a side of the first module or the second module, the optional capsule dispensing apparatus comprising a plurality of capsules, each containing either a consumable product or a non-consumable product. The user interface comprises a touch-screen monitor and the controller communicates with a remote server containing a database for storing data received from the controller, the data comprising a consumable product quantity in each bin. An operator can communicate with the controller from a remote location to review consumable product quantity in each bin. A payment interface for accepting payment from the user is located in a front surface of the vending machine and includes a card reader for accepting a card and where the card stores a credit value for making an acquisition of at least one of the consumable products.

A third embodiment the vending machine comprises a first module that includes a plurality of bins, each sized to contain a consumable product, each bin comprising a pivotable product container. A capsule dispensing apparatus is located on a side of the first module, the capsule dispensing apparatus comprising a plurality of capsules, each containing either a consumable product or a non-consumable product. A second module comprising a second plurality of bins, each also sized to contain a consumable product, each bin also comprising a pivotable product container, the second module removeably attached to the first module.

The third embodiment includes an interface structured to receive a user request for one of the consumable products and a controller for dispensing the requested consumable product from the associated bin in an amount corresponding to the user request. The user interface comprises a touch-screen monitor and the controller communicates with a remote server containing a database for storing data received from the controller, the data comprising a consumable product quantity in each bin. A consumable product conveyor comprises a circulating belt and a circulating belt cleaning element.

Thus, it is seen that a VM 10 is provided. One skilled in the art will appreciate that the present invention can be practiced by other than the above-described embodiments, which are presented in this description for purposes of illustration and not of limitation. The specification and drawings are not intended to limit the exclusionary scope of this patent document. It is noted that various equivalents for the particular embodiments discussed in this description may practice the invention as well. That is, while the present invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives.

The invention claimed is:

1. A vending machine, comprising:
a first module comprising:
    a plurality of bins, each sized to contain a consumable product;
    a capsule dispensing apparatus sized to fit on a side of the first module, the capsule dispensing apparatus comprising an elongated shape, and sized to be capable of containing a plurality of capsules, each containing either a consumable product or a non-consumable product, with a portion of the capsule dispensing apparatus positioned within the first module so that the plurality of capsules are dispensed from a capsule outlet located on a front of the first module; and
    an optional second module comprising a second plurality of bins, each also sized to contain a consumable product, the optional second module sized to be removeably attachable to the first module.

2. The vending machine of claim 1, further comprising a bin cover sized to cover a portion of each bin that faces a front of the first module, the bin cover structured to receive the consumable product.

3. The vending machine of claim 1, where each of the bins includes a bin door sized to receive the consumable product, the bin door located on a surface of the bin that faces a front of the first module.

4. The vending machine of claim 1, further comprising a touch-screen monitor located on a front of the first module, the monitor capable of displaying a video game.

5. The vending machine of claim 1, further comprising a display case located on a back portion of the first module.

6. The vending machine of claim 1, further comprising a monitor located on a back portion of the vending machine, the monitor adapted to display a video image.

7. The vending machine of claim 1, where each bin includes a plurality of light emitters and light receivers that provide an indication of consumable product quantity in each bin.

8. The vending machine of claim 1, further comprising a consumable product conveyor including a circulating belt and a circulating belt cleaning element.

9. A vending machine, comprising:
a first module comprising:
    a first plurality of bins, each sized to contain a consumable product;
    a capsule dispensing apparatus sized to fit on a side of the first module, the capsule dispensing apparatus sized to be capable of containing a plurality of capsules, with a portion of the capsule dispensing apparatus positioned within the first module so that the plurality of capsules are dispensed from a capsule outlet located on a front of the first module;
    an interface structured to receive a user request for one of the consumable products;
    a controller for dispensing the requested consumable product from the associated bin in an amount corresponding to the user request; and
    a second module comprising a second plurality of bins, the second module removeably attachable to the first module, each bin also sized to contain a consumable product, the second module responsive to the interface and the controller so that the consumable products in the second plurality of bins are dispensed in response to the user request.

10. The vending machine of claim 9, further comprising an optional capsule dispensing apparatus sized to fit on a side of the first module or the second module, the optional capsule dispensing apparatus comprising a plurality of capsules, each containing either a consumable product or a non-consumable product.

11. The vending machine of claim 9, where the user interface comprises a touch-screen monitor.

12. The vending machine of claim 9, where the controller communicates with a remote server containing a database for storing data received from the controller, the data comprising a consumable product quantity in each bin.

13. The vending machine of claim 9, where an operator can communicate with the controller from a remote location to review consumable product quantity in each bin.

14. The vending machine of claim 9, further comprising a payment interface for accepting payment from the user.

15. The vending machine of claim 14, where the payment interface includes a card reader for accepting a card and where the card stores a credit value for making an acquisition of at least one of the consumable products.

16. A vending machine, comprising:
a first module comprising:
    a plurality of bins, each sized to contain a consumable product;
    a capsule dispensing apparatus located on a side of the first module, the capsule dispensing apparatus comprising an elongated shape, and sized to be capable of containing a plurality of capsules, each capsule containing either a consumable product or a non-consumable product, with a portion of the capsule dispensing apparatus positioned within the first module so that the plurality of capsules are dispensed from a capsule outlet located on a front of the first module; and
    a second module comprising a second plurality of bins, each also sized to contain a consumable product, the second module removeably attachable to the first module.

17. The vending machine of claim 16, further comprising an interface structured to receive a user request for one of the consumable products and a controller for dispensing the requested consumable product from the associated bin in an amount corresponding to the user request.

18. The vending machine of claim 17, where the user interface comprises a touch-screen monitor.

19. The vending machine of claim 17, where the controller communicates with a remote server containing a database for storing data received from the controller, the data comprising a consumable product quantity in each bin.

20. The vending machine of claim 16, further comprising a consumable product conveyor including a circulating belt and a circulating belt cleaning element.

* * * * *